(12) United States Patent
Resek et al.

(10) Patent No.: US 11,380,949 B2
(45) Date of Patent: Jul. 5, 2022

(54) COOLANT DISTRIBUTION INTERFACE FOR A BATTERY MODULE HOUSING

(71) Applicant: Samsung SDI Co., Ltd., Yongin-si (KR)

(72) Inventors: Matthias Resek, Wagersbach (AT); Gernot Zavcar, Graz (AT)

(73) Assignee: SAMSUNG SDI CO., LTD., Yongin-si (KR)

(*) Notice: Subject to any disclaimer, the term of this patent is extended or adjusted under 35 U.S.C. 154(b) by 120 days.

(21) Appl. No.: 16/770,400

(22) PCT Filed: Jan. 22, 2019

(86) PCT No.: PCT/KR2019/000865
§ 371 (c)(1),
(2) Date: Jun. 5, 2020

(87) PCT Pub. No.: WO2019/146984
PCT Pub. Date: Aug. 1, 2019

(65) Prior Publication Data
US 2020/0295417 A1    Sep. 17, 2020

(30) Foreign Application Priority Data

Jan. 23, 2018  (EP) ..................................... 18153017
Jan. 17, 2019  (KR) ....................... 10-2019-0006426

(51) Int. Cl.
*H01M 10/6567*    (2014.01)
*H01M 10/625*     (2014.01)
(Continued)

(52) U.S. Cl.
CPC ... *H01M 10/6567* (2015.04); *H01M 10/4228* (2013.01); *H01M 10/625* (2015.04); *H01M 50/20* (2021.01); *H01M 2220/20* (2013.01)

(58) Field of Classification Search
None
See application file for complete search history.

(56) References Cited

U.S. PATENT DOCUMENTS

| 5,090,871 A | 2/1992 | Story et al. |
| 2011/0154886 A1 | 6/2011 | Carns et al. |
| (Continued) | | |

FOREIGN PATENT DOCUMENTS

| DE | 10 2016 001 145 A1 | 8/2017 |
| DE | 10302016001145 | * 8/2017 |
| (Continued) | | |

OTHER PUBLICATIONS

Extended European Search Report for corresponding European Application No. 18153017.1, dated Jun. 15, 2018, 6pp.

*Primary Examiner* — Lisa S Park
(74) *Attorney, Agent, or Firm* — Lewis Roca Rothgerber Christie LLP

(57) ABSTRACT

A coolant distribution interface for a battery system includes a battery module housing comprising a coolant channel, and at least one mounting portion located at an entrance of the coolant channel, wherein the mounting portion comprises a first sealing section and a second sealing section; a matching housing comprising a matching coolant channel, and at least one matching mounting portion located at an entrance of the matching coolant channel, wherein the matching mounting portion comprises a first matching sealing section and a second matching sealing section; a joint coolant channel configured to connect the coolant channel of the mounting portion and the matching coolant channel of the matching mounting portion; a shared sealing element locating between the second sealing section and the second matching sealing section; a channel sealing element sealing the first sealing section and first matching sealing section against the joint coolant channel; a security chamber configured to form by (Continued)

the mounting portion, the matching mounting portion, the shared sealing element and channel sealing element; and a testing channel connecting the security chamber with an outside of the battery module housing and the matching housing, wherein the test channel is penetrated at least one of the battery module housing and the matching housing.

15 Claims, 5 Drawing Sheets

(51) Int. Cl.
*H01M 10/42* (2006.01)
*H01M 50/20* (2021.01)

(56) References Cited

U.S. PATENT DOCUMENTS

| | | |
|---|---|---|
| 2013/0244077 A1 | 9/2013 | Palanchon et al. |
| 2018/0212267 A1 | 7/2018 | Kritzer et al. |

FOREIGN PATENT DOCUMENTS

| | | |
|---|---|---|
| JP | 2007-333733 A | 12/2007 |
| JP | 2014-229421 A | 12/2014 |
| KR | 10-0128805 B1 | 11/1993 |
| KR | 10-2013-0020453 A | 2/2013 |
| KR | 10-2013-0122741 A | 11/2013 |
| KR | 10-2014-0037305 A | 3/2014 |
| KR | 10-2015-0083438 A | 7/2015 |
| KR | 10-2017-0036082 A | 3/2017 |
| WO | WO 2010/094787 A1 | 8/2010 |

* cited by examiner

COOLANT DISTRIBUTION INTERFACE FOR A BATTERY MODULE HOUSING

CROSS-REFERENCE TO RELATED APPLICATION(S)

This application is a National Phase Patent Application of International Patent Application Number PCT/KR2019/000865, filed on Jan. 22, 2019, which claims priority of European Patent Application No. 18153017.1, filed Jan. 23, 2018 and Korean Patent Application No. 10-2019-0006426, filed Jan. 17, 2019. The entire contents of all of which are incorporated herein by reference.

TECHNICAL FIELD

The present invention relates to a coolant distribution interface, a battery system, wherein a cooling unit is connected to a battery module housing by the coolant distribution interface, further to a vehicle with the battery system and to a method of testing the leak tightness of the coolant distribution interface.

BACKGROUND ART

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

Rechargeable batteries may be used as a battery module formed of a plurality of unit battery cells coupled in series and/or in parallel so as to provide a high energy density, e.g. for motor driving of a hybrid vehicle. That is, the battery module is formed by interconnecting the electrode terminals of the plurality of unit battery cells depending on a required amount of power and in order to realize a high-power rechargeable battery, e.g. for an electric vehicle.

To provide thermal control of a battery system a thermal management system is provided to safely use the at least one battery module by efficiently emitting, discharging and/or dissipating heat generated from its rechargeable batteries. If the heat emission/discharge/dissipation is not sufficiently performed, temperature deviations occur between respective battery cells, such that the at least one battery module cannot generate a desired amount of power. In addition, an increase of the internal temperature can lead to abnormal reactions occurring therein and thus charging and discharging performance of the rechargeable deteriorates and the life-span of the rechargeable battery is shortened. Thus, cell cooling for effectively emitting/discharging/dissipating heat from the cells is required.

The thermal management system usually includes a closed cooling circuit, means for pumping a cooling medium through the cooling circuit, thermal sensors and regulation means for controlling the cooling or heating of the battery system, in particular the battery modules. The cooling circuit may involve construction elements like distributers, connectors, cooling channels or cooling tubes, which stacked together during the manufacturing process of the battery system. Preferably, the cooling circuit could in sections directly be formed by a battery module housing. However, since liquid cooling media, such as water or alkanols, may conduct electricity, initiate corrosive processes or react with compounds of the battery cells located inside the battery module housing if coming into contact with them, this results in a high risk of leakage.

However, known technical solutions suffer from having a high number of interfaces in the cooling circuit. Further, leak tightness of the known cooling circuits has to be assured reactively, if a leakage is detected.

DISCLOSURE

Technical Problem

It is therefore an objective of the invention to provide an improved coolant distribution interface for a battery system that allows for proactively assuring the functionality of a sealing and at the same time reduced the number of required sealing points.

Technical Solution

These objectives are achieved by the subject-matter of the independent claims 1, 11, 13 and 15. Further aspects of the present invention could be learned from the dependent claims or the following description.

A first aspect of the invention relates to a coolant distribution interface for a battery system, comprising a battery module housing comprising a coolant channel, and at least one mounting portion located at an entrance of the coolant channel, wherein the mounting portion comprises a first sealing section and a second sealing section; a matching housing comprising a matching coolant channel, and at least one matching mounting portion located at an entrance of the matching coolant channel, wherein the matching mounting portion comprises a first matching sealing section and a second matching sealing section; a joint coolant channel configured to connect the coolant channel of the mounting portion and the matching coolant channel of the matching mounting portion; a shared sealing element locating between the second sealing section and the second matching sealing section; a channel sealing element sealing the first sealing section and first matching sealing section against the joint coolant channel; a security chamber configured by the mounting portion, the matching mounting portion, the shared sealing element and the channel sealing element; and a testing channel connecting the security chamber with an outside of the battery module housing and the matching housing, wherein the test channel penetrates at least one of the battery module housing and the matching housing.

In other words, the coolant distribution interface assures the leak tightness of a sealing point by providing an inner sealing that faces a coolant line, with the coolant line formed by two housings that are connected at the sealing point. One of the housings is a battery module housing and the other housing is preferably a housing of a cooling unit, even though other technical systems may be connected to the battery housing and provide the matching (or complementary) housing. For example, the matching housing can also belong to another battery module. The inner sealing is arranged inside the coolant line and contacts the two housings tightly, thereby covering the sealing point. Behind the inner sealing and between the two housings, a supporting sealing is arranged. A space between the supporting sealing, the two housings and the inner sealing is forming a cavity.

If the inner sealing is malfunctioned, coolant may enter the cavity. Here, the supporting sealing still prevents the coolant from exiting the sealing point. However, a defect of the inner sealing and the supporting sealing cannot be seen from outside the housings and is therefore hardly detectable during quality inspection. That is why, once the support sealing has reached the end of its life-time likewise, coolant could discharge from the sealing point and enter the battery module housing.

The coolant distribution interface of the invention solves this problem by providing a testing channel that ranges from outside the housings, which means the place of quality inspection, though the material of one of the housings into the cavity. If the inner sealing has reached its end of life-time and coolant has entered the cavity, the coolant can be detected from outside by application of a testing device through the testing channel. The coolant can thus be detected before it may overcome the support sealing, as well. Also drainage of the coolant via the test channel is possible. The inner sealing may even be tested regarding its quantitative sealing effect by application of a low test pressure to the test channel. Furthermore, because of the testing channel, the shared sealing element can be leak tested during battery housing over pressure and negative pressure test and the channel sealing element can be leak tested during cooling circuit over pressure and negative pressure test.

This way the coolant distribution interface of the invention allows for designing sealing points directly at the battery module housing, thereby reducing the number of required parts. At the same time, the security against leakage is very high. If the testing channel is not used for testing or draining it may be additionally sealed by cap, plug, screwable element or the like.

The testing channel may comprise a vertical portion, extending from the security chamber and running parallel to the joint coolant channel. If coolant is collected in the security chamber, the coolant level may rise in this vertical portion. Advantageously, due to static pressure only the coolant can be prevented from entering too deeply into the testing channel. The geometry of the coolant channel can be designed by a person skilled in the art, according to the fluid conditions in the joint coolant channel. In other embodiments, the vertical portion may also run in a specified angle to the joint coolant channel.

The vertical portion may run parallel to the joint coolant channel at least until it reaches a contact zone between the channel sealing element and the first sealing section or first matching sealing section. This way, height levels of the contact zone and the upper end of the vertical portion are at least equal, referring to the security chamber as a common reference height level. However, in other embodiments the height levels could also be set independently from each other.

The testing channel may comprise a horizontal portion, extending radially to the joint coolant channel to the outside of the respective housing. In other words, the testing channel may have an L-like geometry. This way, a point for sealing inspection can be flexibly chosen at the outside of the housing.

A testing channel thread may provide at a port, where the testing channel reaches the outside of the respective housing. The thread allows for secure coupling of a testing device with the port. The testing device may even be coupled permanently to the port. For example, a low pressure may permanently be applied to the testing channel so as to immediately detect a defect of the inner sealing at the first time. The testing device can also be a drainage device.

A testing channel sealing surface may provide at a port, where the testing channel reaches the outside of the respective housing. The testing channel sealing surface can be an area on the surface, machined according to sealing requirements. Drainage and testing of coolant is improved this way as leakage is avoided.

The shared sealing element may be an O-ring as it is most suitable to form the security chamber. There may be other types of sealing the person skilled in the art choses independently. For example, an X-ring or any form sealing ring or even a foamed sealing may be used.

The channel sealing element may be a collar-like sealing insert. In other words, the channel sealing element is like a tube-like or pipe-like insert placed inside the joint coolant channel in order to seal the security chamber against the joint coolant channel. In other embodiments, an O-ring sealing may also be used. This way the channel sealing element is very easy to be assembled and assures safe positioning in the joint coolant channel. Advantageously, assembly tolerances can be designed wider with a tube like sealing insert, compared to another sealing concept e.g. an O-ring sealing. When an O-Ring is used instead, the tolerances have to be more tight.

The battery module housing has at least two mounting portions, being an upper mounting portion and a lower mounting portion. This allows for advantageously dividing the joint coolant channel and therefore the coolant circuit into different sub-circuits in order to circulate around an inner wall of the battery module housing.

The upper mounting portion and the lower mounting portion are located at an upper entrance and a lower entrance, respectively, of the joint coolant channel. This advantageously allows for machining the joint coolant channel in the battery module housing and the matching housings of the cooling unit, to be connected to the upper mounting portion and the lower mounting portion, in one clamping.

A second aspect of the invention refers to a battery system, comprising a battery module, including a plurality of battery cells; a battery module housing for accommodating the at least one battery module; and a cooling unit, wherein the battery module housing and a matching housing of the cooling unit being connected by an inventive coolant distribution interface according to the preceding description.

Further preferred embodiments correspond to preferred embodiments of the inventive coolant distribution interface as described above.

The battery system of the invention may comprise a plurality of battery modules, all accommodated by the battery module housing to enhance the electrical capacity and compactly integrate the battery modules in one coolant circuit.

A third aspect of the invention refers to a vehicle, comprising an inventive battery system according to the preceding description.

Further preferred embodiments correspond to preferred embodiments of the inventive coolant distribution interface and the inventive battery system as described above.

A joint coolant channel of the coolant distribution interface may extend a vertical direction, so that an upper mounting portion and a lower mounting portion of the battery module housing defined an upper and lower coolant level with the joint coolant channel extending vertically between the upper and lower coolant level. Due to this arrangement, a testing channel for leak testing a security chamber between the battery module housing and a matching housing can be easily adapted to different height levels.

A fourth aspect of the invention refers to a method of testing the leak tightness of a coolant distribution interface for a battery system, wherein the coolant distribution interface comprises a battery module housing comprising a coolant channel, and at least one mounting portion located at an entrance of the coolant channel, wherein the mounting portion comprises a first sealing section and a second sealing section; a matching housing comprising a matching coolant channel, and at least one matching mounting portion located at an entrance of the matching coolant channel, wherein the matching mounting portion comprises a first matching sealing section and a second matching sealing section; a joint coolant channel connecting the coolant channel of the mounting portion and the matching coolant channel of the matching mounting portion; a shared sealing element locating between the second sealing section and the second matching sealing section; a channel sealing element sealing against the joint coolant channel the first sealing section and the first matching sealing section; a security chamber configured to be formed by the mounting portion, the matching mounting portion, the shared sealing element and the channel sealing element; and a testing channel connecting the security chamber with an outside of the respective housing, wherein the test channel penetrates at least one of the battery module housing and the matching housing. The method of the present invention comprises a step of applying a leak tightness testing line to the testing channel from the outside and applying a negative pressure to the leak tightness testing line.

The term negative pressure may refer to any difference in the pressure applied to the security chamber via the testing channel and any reference point outside the security chamber with the respective sealing elements in-between for testing purposes. For example, a testing pressure may also be applied to the joint coolant channel from the outside which means an over pressure or under pressure and a corresponding over or under pressure may be applied to the leak tightness testing line, respectively to the housings from the outside.

The coolant distribution interface, the battery system or vehicle tested in the method are preferably designed according to the invention as described above.

The leakage testing can imply drainage of coolant that has entered the security chamber. The leakage testing can be performed in quality inspection intervals or permanently. In a permanent testing process a low pressure can be applied permanently by a testing device attached to the testing channel. Means of electronic data acquisition may collect the data delivered by the testing device to immediately detect a leakage occurring at one of the sealings. The leakage could be detected by a characteristic change in a pressure value measured.

Advantageous Effects

According to the coolant distribution interface of the present invention, it is possible to check in advance before the coolant leaks.

DESCRIPTION OF DRAWINGS

Features will become apparent to those of ordinary skill in the art by describing in detail exemplary embodiments with reference to the attached drawings in which.

MODE FOR INVENTION

Figure 1:
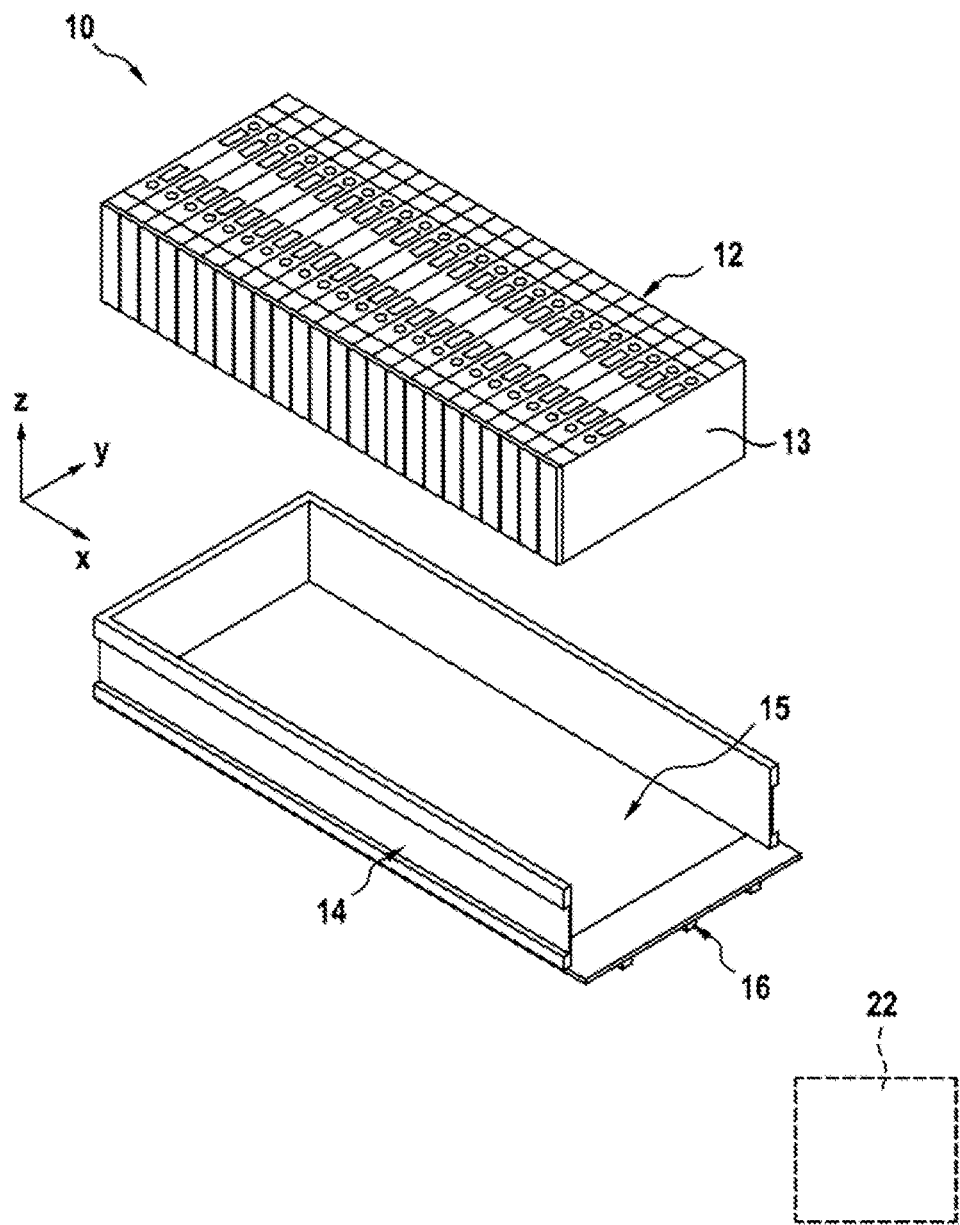
FIG. 1 illustrates a schematic perspective view of a battery system according to an embodiment.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

In the drawings, the sizes of elements may be exaggerated for clarity. For example, in the drawings, the size or thickness of each element may be arbitrarily shown for illustrative purposes, and thus the embodiments of the present invention should not be construed as being limited thereto.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a film, a region, or an element is referred to as being "above" or "on" another film, region, or element, it can be directly on the other film, region, or element, or intervening films, regions, or elements may also be present.

Herein, the terms "upper" and "lower" are defined according to the z-axis. For example, the upper cover is positioned at the upper part of the z-axis, whereas the lower cover is positioned at the lower part thereof. In the drawings, the sizes of elements may be exaggerated for clarity. For example, in the drawings, the size or thickness of each element may be arbitrarily shown for illustrative purposes, and thus the embodiments of the present invention should not be construed as being limited thereto.

Features of the inventive concept and methods of accomplishing the same may be understood more readily by reference to the following detailed description of embodiments and the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates a schematic perspective view of a battery system 10 according to an embodiment. The battery system 10 comprises a number of battery modules 12, each one comprising a number of battery cells 13. The battery module 12 can be placed in a battery module housing 14 which has an accumulating space 15, and can be assembled to the module housing 14.

Figure 2:
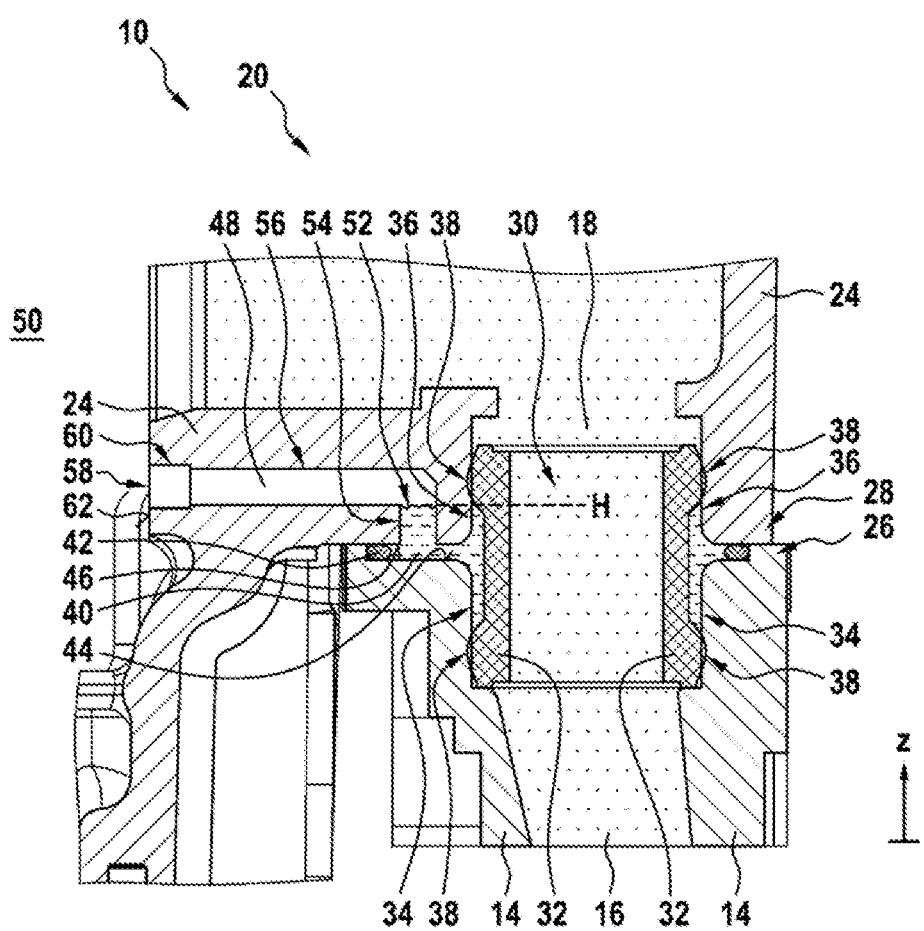
FIG. 2 illustrates a schematic cross section of a coolant distribution interface according to an embodiment.

The battery module housing 14 has one or more coolant channels 16 formed by the battery module housing 14. The coolant channel may be configured by a part of the battery module housing 14, or a separately provided member (for example, a duct) may be installed in the battery module housing 14. The coolant channels 16 in this embodiment is provided on a portion of the battery module housing 14 disposed in a structure protruding outside a bottom portion of the battery module housing 14, but the present invention is not necessarily limited thereto. The coolant channel 16 may be connected with a matching coolant channel 18 via a coolant distribution interface 20 so that a coolant can flow, as shown in FIG. 2. The matching coolant channel 18 is comprised by a cooling unit 22, schematically illustrated in FIGS. 1 and 4.

The cooling unit 22 supplies a coolant to a cooling circuit made together with the battery module housing 14.

FIG. 2 illustrates a schematic cross section of a coolant distribution interface 20 with reference to the preceding description. As can be seen, the battery module housing 14 is connected to a matching housing 24 that belongs to the cooling unit 22. The coupling of the battery module housing 14 and the matching housing 24 is done by a mounting portion 26 of the battery module housing 14 and a matching mounting portion 28 of the matching housing 24 of the cooling unit 22. The assembly of the mounting portion 26 and the matching mounting portion 28 can be done by a screwing connection, for example.

If the mounting portion 26 and the matching mounting portion 28 are connected, the coolant channel 16 and the matching coolant channel 18 are forming a joint coolant channel 30, which means the hydrodynamic diameters of the coolant channel 16 and the matching coolant channel 18 are connected and allow for a coolant to circulate.

FIG. 2 shows that the joint coolant channel 30 is sealed by a channel sealing element 32. For example, the channel sealing element 32, which can be a collar-like sealing insert, is placed inside the joint coolant channel 30. The mounting portion 26 and the matching mounting portion 28 each comprise a sealing section in contact with the joint coolant channel 30 which are a first sealing section 34 and a first matching sealing section 36. The channel sealing element 32 seals the sealing sections 34, 36 against the joint coolant channel 30 by contacting them in a contact zone 38 between the battery module housing 14 and the matching housing 24.

Between the channel sealing element 32, more precisely between the contact zone 38, the mounting portion 26 and the matching mounting portion 28 a security chamber 40 is formed, which is limited by a shared sealing element 42. The shared sealing element 42 is arranged between the mounting portion 26 and the matching mounting portion 28. It limits the security chamber 40 by contacting a second sealing section 44 provided by the battery module housing 14 and a second matching sealing section 46 provided by the matching housing 24.

If the channel sealing element 32 is not sealing properly in the contact zone 38, coolant can enter the security chamber 40. Here, it will be collected and prevented from entering the battery module housing 14 by the shared sealing element 42, which is an O-ring in the illustrated embodiment. However, even the shared sealing element 42 has a limited life-time.

In order to assure leak tightness of the shared sealing element 42 and the shared sealing element 42 the present invention suggests to provide a testing channel 48. In the shown embodiment, the testing channel 48 penetrates the material of the matching housing 24, which means in other words that the testing channel 48 is formed by the matching housing 24 and thereby connects the security chamber 40 with an outside 50 of the matching housing 24. Through this testing channel 48 it is possible at any time, form the outside 50, to test the security chamber 40 for coolant accumulation 52, which may be a hint that the channel sealing element 32 is not working properly. If necessary, the coolant can be drained from the security chamber 40 via the testing channel 48.

To assure that the coolant accumulation 52 is collected properly within the testing channel 48 a vertical portion 54 is designed. It ranges vertically from the security chamber 40, which means parallel to the joint coolant channel 30, up to a height level H of the contact zone 38.

This way the coolant accumulation 52 can impose a hydrostatic pressure on the security chamber 40, opposing a hydrostatic pressure cause by the coolant leaking form the contact zone 38 into the security chamber 40.

At the height level H, a horizontal portion 56 of the testing channel 48 extends horizontally, which means radially with regard to the joint coolant channel 30, to the outside 50.

There may be a port 58 and a testing channel thread 60 provided, where the testing channel 48 reaches the outside 50. Here, a testing or drainage device can be applied or the testing channel 48 can be secured by a threaded cap. To assure safe application of the device, a testing channel sealing surface 62 is provided at the port 58.

Figure 3:
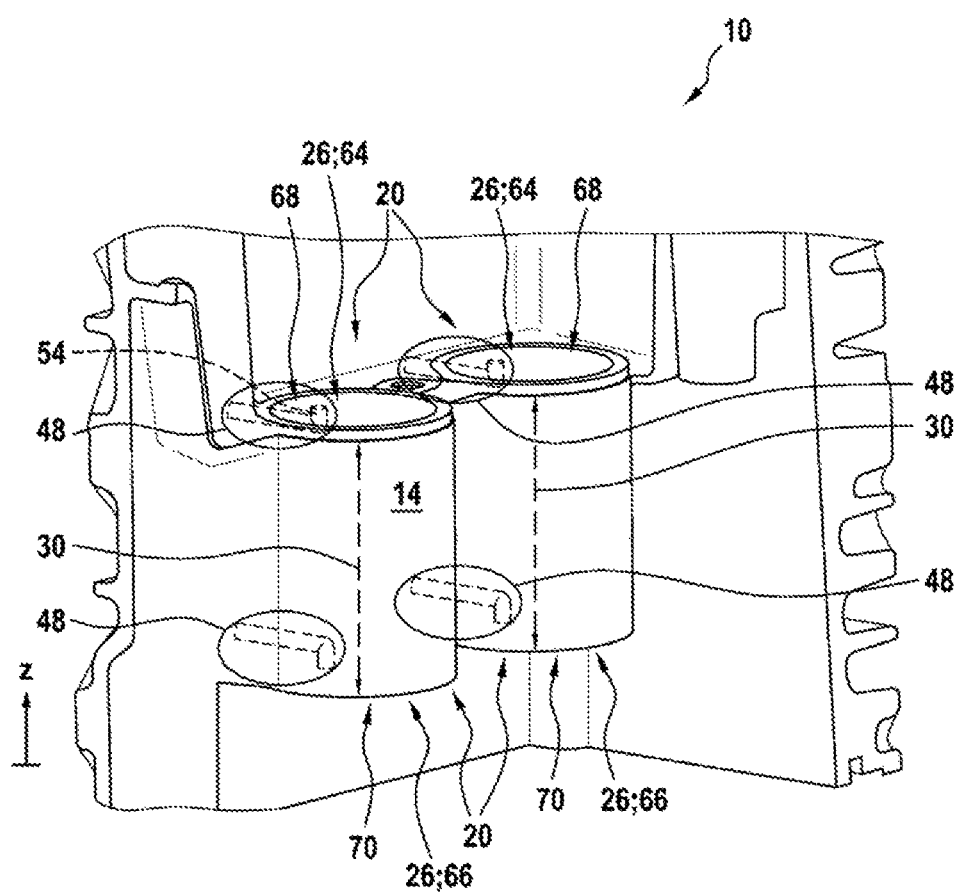
FIG. 3 illustrates a schematic isometric view of a coolant distribution interface according to another embodiment.

FIG. 3 illustrates a schematic isometric view of a coolant distribution interface according to another embodiment with reference to the preceding description. As can be seen a number of coolant distribution interfaces 20 of the type illustrated in FIG. 2 can be provided in the battery system 10, wherein FIG. 3 focusses on the design of the battery module housing 14 and therefore does not show the matching housing 24.

Here, the battery module housing 14 has four mounting portions 26, with two of the mounting portions 26 being upper mounting portions 64 and two of the mounting portions 26 being lower mounting portions 66. To each upper mounting portion 64 and each lower mounting portion 66 a matching housing 24 can be assembled. Thus, two joint coolant channels 30 can be formed, each with an upper entrance 68 at the upper mounting portion 64 and a lower entrance 70 at the lower mounting portion 66.

As can be seen, the testing channel 48 is provided by the battery module housing 14. In the upper mounting portions 64 the testing channel 48 is shown, just as an example, with its vertical portion 54 extending downwards from the security chamber 40 for fast drainage of coolant.

Figure 4:
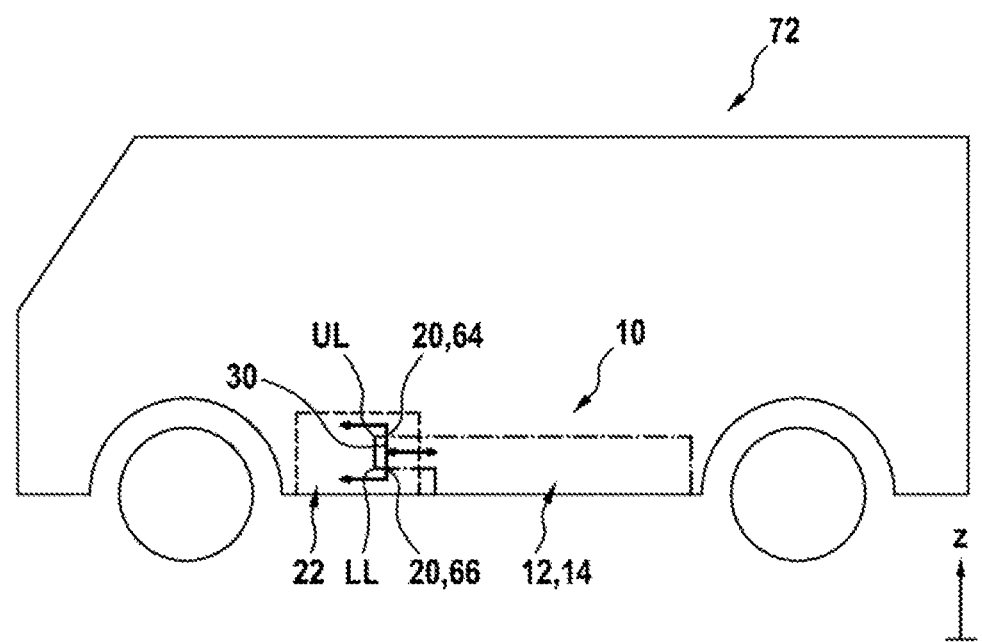
FIG. 4 illustrates a vehicle according to an embodiment.

FIG. 4 illustrates a vehicle 72 according to an embodiment with reference to the preceding description. The vehicle 72 is equipped with a battery system 10. A joint coolant channel 30 of a coolant distribution interface 20 is extending in a vertical direction, so that an upper mounting portion 64 and a lower mounting portion 66 of a battery module housing 14 define an upper coolant level (UL) and lower coolant level (LL), with the joint coolant channel 30 extending vertically between the upper and lower coolant level (UL, LL).

Figure 5:
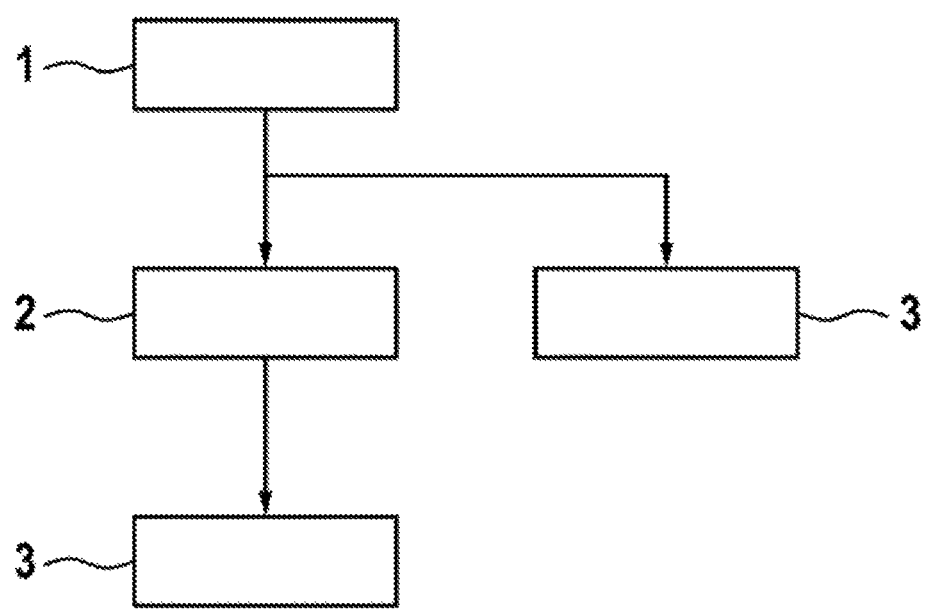
FIG. 5 illustrates a block scheme of a method according to an embodiment.

FIG. 5 illustrates a block scheme of a method of testing the leak tightness of a coolant distribution interface 20 for a battery system 10 according to an embodiment with reference to the preceding description.

In a first step, the battery system 10 is provided, comprising a battery module 12, including a plurality of battery cells and further comprising a battery module housing 14 for accommodating the battery module 12. Further, a cooling unit 22 is provided, and is connected to the battery housing 14 so the coolant can flow.

Therefore, a coolant distribution interface 20 is provided, making use of the battery module housing 14, which comprises at a mounting portion 26 located at an entrance of a coolant channel 16 being formed by the battery module housing 14, wherein the mounting portion 26 features a first sealing section 34 and a second sealing section 44.

A matching housing 24 is comprised by the cooling unit 22 with a matching mounting portion 28 located at an entrance of a matching coolant channel 18 being formed by the matching housing 24, wherein the matching mounting portion 28 features a first matching sealing section 36 and a second matching sealing section 46.

The mounting portion 26 and the matching mounting portion 28 are mounted together, thereby connecting the coolant channel 16 with the matching coolant channel 18 so as to form a joint coolant channel 30.

A shared sealing element 42 is located between each second sealing section 44 and second matching sealing section 46 and each first sealing section 34 and first matching sealing section 36 are sealed against the joint coolant channel 30 by a channel sealing element 32, so that a security chamber 40 is formed by the respective mounting portions 26, 28, the shared sealing element 42 and channel sealing element 32.

A testing channel 48 penetrates the matching housing 24, thereby connecting the security chamber 40 with an outside 50 of the respective housing 24.

In a second step, coolant is driven through the joint coolant channel 30, delivered by the cooling unit 22.

In a third step, that can run after or parallel to step 2, a leak tightness testing line is applied to the testing channel 48 from the outside 50 and a negative pressure is applied to the leak tightness testing line. Based on the negative pressure coolant can be drained and the tightness of the channel sealing element 32 can be tested.

Alternatively, in a second step, air is driven through the joint coolant channel 30, delivered by an external testing device. When the channel sealing element 32 is not tight the air will flow outside through the testing channel 48 so that no pressure can be built up. In a third step, air is driven through the matching housing 24, delivered by an external testing device. When the shared sealing element 42 is not tight the air will flow outside through the testing channel 48 so that no pressure can be built up.

Although the invention has been explained in relation to its preferred embodiments as described above, it is to be understood that many other possible modifications and variations can be made without departing from the scope of the present invention. It is, therefore, contemplated that the appended claim or claims will cover such modifications and variations that fall within the scope of the invention.

REFERENCE SIGNS 10 battery system
14 battery module housing
16 coolant channel
18 matching coolant channel
20 coolant distribution interface
24 matching housing
26 mounting portion
28 matching mounting portion
30 joint coolant channel
32 channel sealing element
34 first sealing section
36 first matching sealing section
40 security chamber
42 shared sealing element
48 testing channel
50 outside

The invention claimed is:

1. A coolant distribution interface for a battery system, comprising:
a battery module housing comprising a coolant channel and a mounting portion located at an entrance of the coolant channel, wherein the mounting portion comprises a first sealing section and a second sealing section;
a matching housing comprising a matching coolant channel and a matching mounting portion located at an entrance of the matching coolant channel, wherein the matching mounting portion comprises a first matching sealing section and a second matching sealing section;
a joint coolant channel configured to connect the coolant channel of the mounting portion and the matching coolant channel of the matching mounting portion;
a shared sealing element located between the second sealing section and the second matching sealing section;
a channel sealing element sealing the first sealing section and first matching sealing section against the joint coolant channel;
a security chamber configured by the mounting portion, the matching mounting portion, the shared sealing element, and the channel sealing element; and a testing channel connecting the security chamber with an outside of the battery module housing and the matching housing, wherein the testing channel penetrates at least one of the battery module housing and the matching housing.

2. The coolant distribution interface for a battery system of claim 1, wherein the testing channel comprises a vertical portion, extending from the security chamber and running parallel to the joint coolant channel.

3. The coolant distribution interface for a battery system of claim 2, wherein the vertical portion runs parallel to the joint coolant channel until it reaches a contact zone between the channel sealing element and the first sealing section or the channel sealing element and the second sealing section.

4. The coolant distribution interface for a battery system of claim 1, wherein the testing channel comprises a horizontal portion, extending radially to the joint coolant channel to the outside of the battery module housing and matching housing.

5. The coolant distribution interface for a battery system of claim 1, further comprising a testing channel thread that is provided at a port, where the testing channel reaches the outside of the battery module housing and matching housing.

6. The coolant distribution interface for a battery system of claim 1, further comprising a testing channel sealing surface provided at a port, where the testing channel reaches the outside of the battery module housing and matching housing.

7. The coolant distribution interface for a battery system of claim 1, wherein the shared sealing element is an O-ring.

8. The coolant distribution interface for a battery system of claim 1, wherein the channel sealing element is a collar-like sealing insert.

9. The coolant distribution interface for a battery system of claim 1, wherein the battery module housing comprises at least two mounting portions, being an upper mounting portion and a lower mounting portion.

10. The coolant distribution interface for a battery system of claim 9, wherein the upper mounting portion and the lower mounting portion are located at an upper entrance and a lower entrance, respectively, of the joint coolant channel.

11. A battery system comprising:
a battery module comprising a plurality of battery cells;
a battery module housing for accommodating the battery module; and
a cooling unit,
wherein the battery module housing and a matching housing of the cooling unit are connected by the coolant distribution interface according to claim 1.

12. The battery system of claim 11, wherein the battery system comprises a plurality of battery modules accommodated by the battery module housing.

13. A vehicle, comprising a battery system of claim 11.

14. The vehicle of claim 13, wherein an upper mounting portion and a lower mounting portion of the battery module housing define an upper coolant level and a lower coolant level, and a joint coolant channel of the coolant distribution interface extends vertically between the upper coolant level and the lower coolant level.

15. A method of testing leak tightness of a coolant distribution interface for a battery system, wherein the coolant distribution interface comprises a battery module housing comprising a coolant channel and a mounting portion located at an entrance of the coolant channel, wherein the mounting portion comprises a first sealing section and a second sealing section; a matching housing comprising a matching coolant channel and a matching mounting portion located at an entrance of the matching coolant channel, wherein the matching mounting portion comprises a first matching sealing section and a second matching sealing section; a joint coolant channel connecting the coolant channel of the mounting portion and the matching coolant channel of the matching mounting portion; a shared sealing element located between the second sealing section and the second matching sealing section; a channel sealing element sealing against the joint coolant channel, the first sealing section and the first matching sealing section; a security chamber configured to be formed by the mounting portion, the matching mounting portion, the shared sealing element, and the channel sealing element; and a testing channel connecting the security chamber with an outside of the respective housing, wherein the testing channel penetrates at least one of the battery module housing and the matching housing, comprising the step of:
applying a leak tightness testing line to the testing channel from the outside, and applying a negative pressure to the leak tightness testing line.

* * * * *